United States Patent [19]
Levin et al.

[11] Patent Number: 5,722,466
[45] Date of Patent: Mar. 3, 1998

[54] CABLE TIE INSTALLATION TOOL

[76] Inventors: Robert F. Levin, P.O. Box 273, Braceville, Ill. 60407; Robert M. Tyler, 1085 Winding Glen Ct., Carol Stream, Ill. 60188

[21] Appl. No.: 782,850

[22] Filed: Jan. 13, 1997

[51] Int. Cl.[6] .................................................. B21F 9/02
[52] U.S. Cl. ........................ 140/93.2; 221/10; 221/278
[58] Field of Search ............................. 140/93.2, 123.6; 221/10, 13, 278

[56] References Cited

U.S. PATENT DOCUMENTS

| | | |
|---|---|---|
| 3,305,131 | 2/1967 | Seaman ................................ 221/278 |
| 3,516,574 | 6/1970 | Andre et al. ......................... 221/278 |
| 3,863,428 | 2/1975 | Baxter . |
| 3,946,769 | 3/1976 | Caveney et al. . |
| 3,976,108 | 8/1976 | Caveney . |
| 4,192,358 | 3/1980 | Bone . |
| 4,254,775 | 3/1981 | Jalas ................................... 221/278 |
| 4,398,194 | 8/1983 | Johnston . |
| 4,498,506 | 2/1985 | Moody et al. . |
| 4,862,928 | 9/1989 | Caveney et al. . |

*Primary Examiner*—Lowell A. Larson
*Attorney, Agent, or Firm*—Mark D. Hilliard; Robert A. McCann; Michael J. Turgeon

[57] ABSTRACT

An automatic cable tie installation tool that conveys the cable tie by pressurized air includes a pressure differential sensing mechanism constructed so as to identify blockages in the transfer tube to prevent subsequent propulsion of the next cable tie into the tube.

8 Claims, 7 Drawing Sheets

CABLE TIE INSTALLATION TOOL

TECHNICAL FIELD

The present invention relates generally to a tool for the automatic installation of a cable tie around a bundle of wires, and more specifically to a tool that utilizes pressurized air as a means to convey the individual cable ties and includes an improved sensing mechanism for avoiding cable tie jams resulting from blockages occurring within a transfer tube of the tool.

BACKGROUND OF THE INVENTION

A wide variety of cable tie application tools are known and some are complicated multiple operation tools that provide individual cable ties from a remote dispenser having a cartridge or reel containing a large number of cable ties to a conveyance mechanism for provision to the application tool.

One special type of cable tie application tool has utilized the application of pressurized air to convey the individual cable ties from the dispenser to a hand manipulated application tool for application to a bundle of wires. See, for example, U.S. Pat. No. 3,946,769 to Caveney et al.

These remote dispenser air convey tools are very desirable and have been highly successful for situations where maximum volume and speed of application is necessary. However, multiple cable tie jams within the transfer hose or tube could lead to potential destruction and subsequent replacement of the transfer tube which may result in extensive delays and repair costs which can be very significant. Therefore it is critical to the avoidance of these problems that once a first cable tie is jammed or some other blockage occurs within the transfer tube of the tool, that a second cable tie is not loaded and fired through the tube. Prior tools used sensors positioned near the entrance end and exit end of the transfer tube such that the sensors detected whether a fired cable tie passed the first sensor but not the second sensor, indicating that the tie never reached the tool. However, this still resulted in situations where the user or a different user could turn the tool off and on or remove and reapply the tube to the tool while a cable tie was still blocked within the tube and load and fire a second cable tie resulting in a costly jam. Therefore, further improvements in the art of avoiding multiple cable tie jams within the transfer tube of air convey cable tie application tools is still needed.

SUMMARY OF THE INVENTION

It is an object of the present invention to provide an improved cable tie installation tool having a cable tie blockage preventing mechanism.

It is further an object of the present invention to provide an improved air convey cable tie installation tool having a sensing mechanism for preventing the firing of a cable tie when an initial blockage in the transfer tube is sensed.

In general, an automatic cable tie installation tool for fastening an individual cable tie around a bundle of wires or the like includes cable tie application means for application of the cable tie around a bundle, cable tie receiving means for receiving and positioning the cable tie for transportation to the cable tie application means, cable tie advancing means utilizing pressurized air for advancing the cable tie from the receiving means through a transfer tube to the application means, control means for controlling the receiving means, sensing means for sensing the presence of a blockage within the transfer tube, and, signaling means for signaling the control means in response to a blockage indicated by the sensing means to prevent the positioning of a next cable tie for transportation to the application means.

DESCRIPTION OF THE PREFERRED EMBODIMENT

A remote dispenser type cable tie application tool system utilizing the application of pressurized air to convey individual cable ties to the hand manipulated tool having a blockage sensing mechanism embodying the concept of the present invention is designated generally by the reference numeral 10 in the accompanying drawings.

Figure 1:
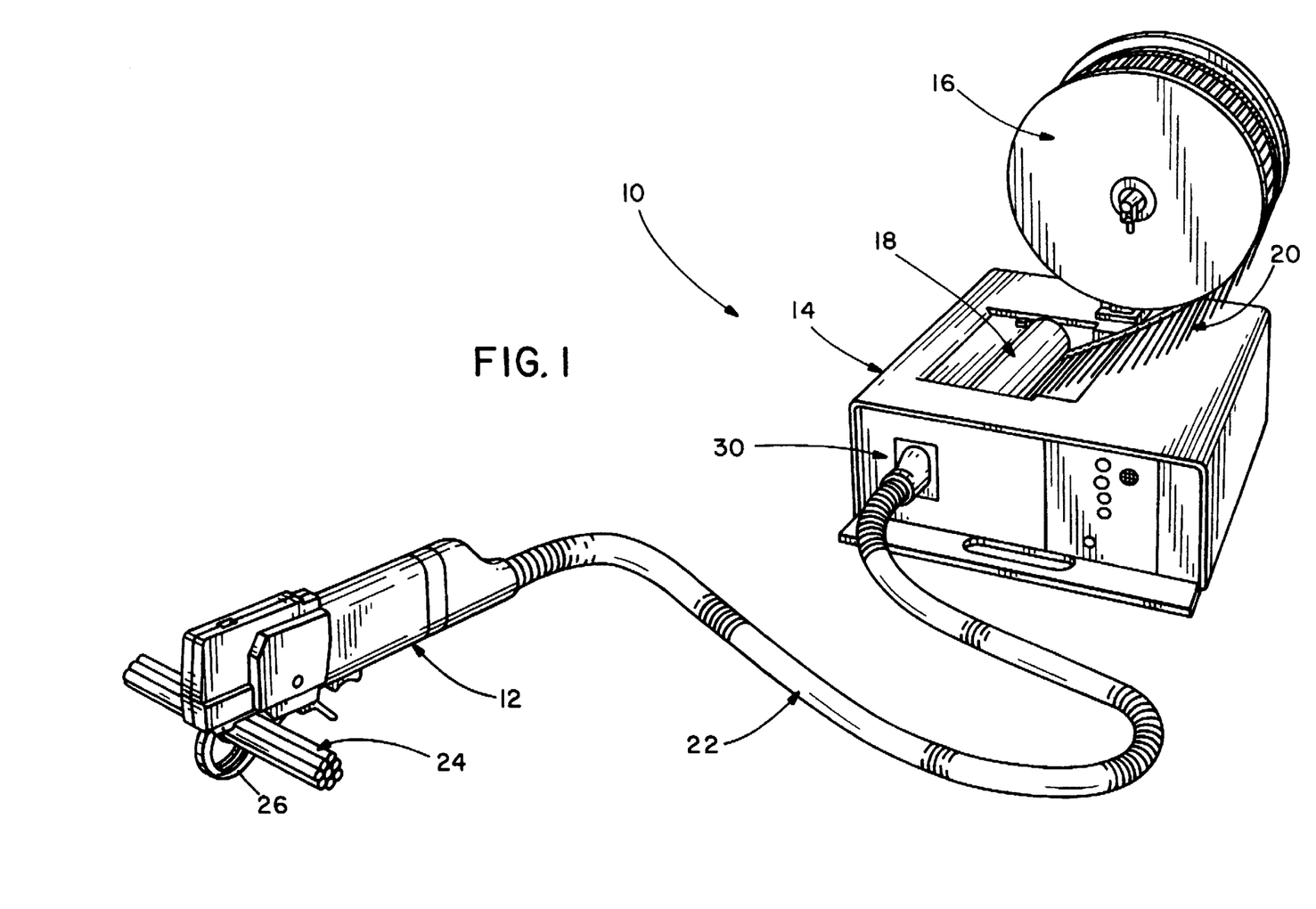
FIG. 1 is a perspective view of an automatic cable tie application tool including a blockage sensing mechanism embodying the concept of the present invention.

As shown in FIG. 1, a cable tie application tool system using a blockage sensing mechanism according to the present invention includes a cable tie application tool 12, a cable tie dispenser 14 connected to the tool 12 via a transfer tube 22. The dispenser 14 is connected to a cable tie reel 16 and receives the individual cable ties 20 through a receiving drum 18. The drum 18 of the dispenser 14 receives and positions the individual cable ties 20 for transfer into and through the transfer tube 22 into position within the application tool 12 for application by the tool jaws 26 around a bundle of wires 24.

Figure 2:
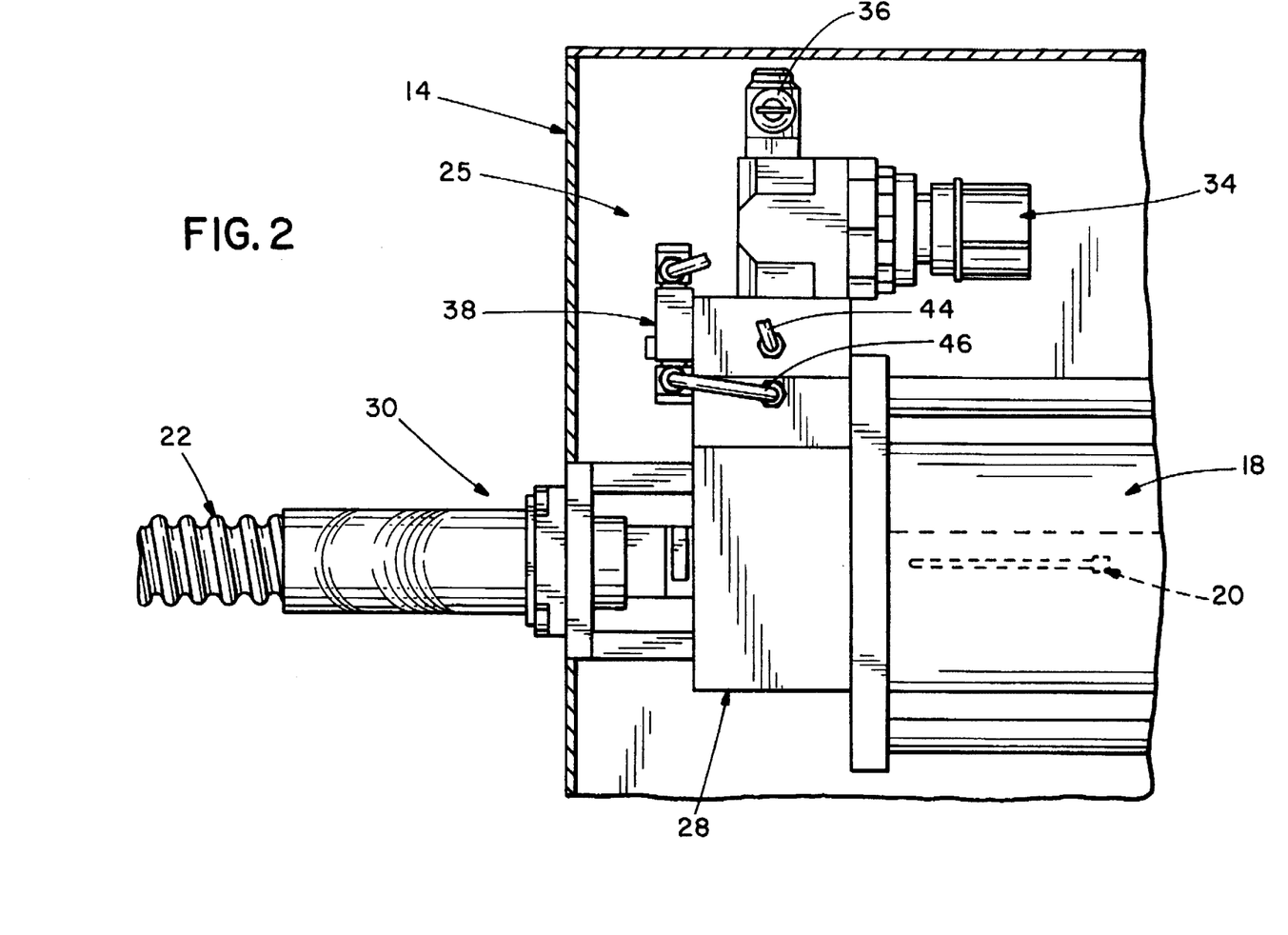
FIG. 2 is a partial plan view of the cable tie blockage sensing mechanism.
Figure 6:
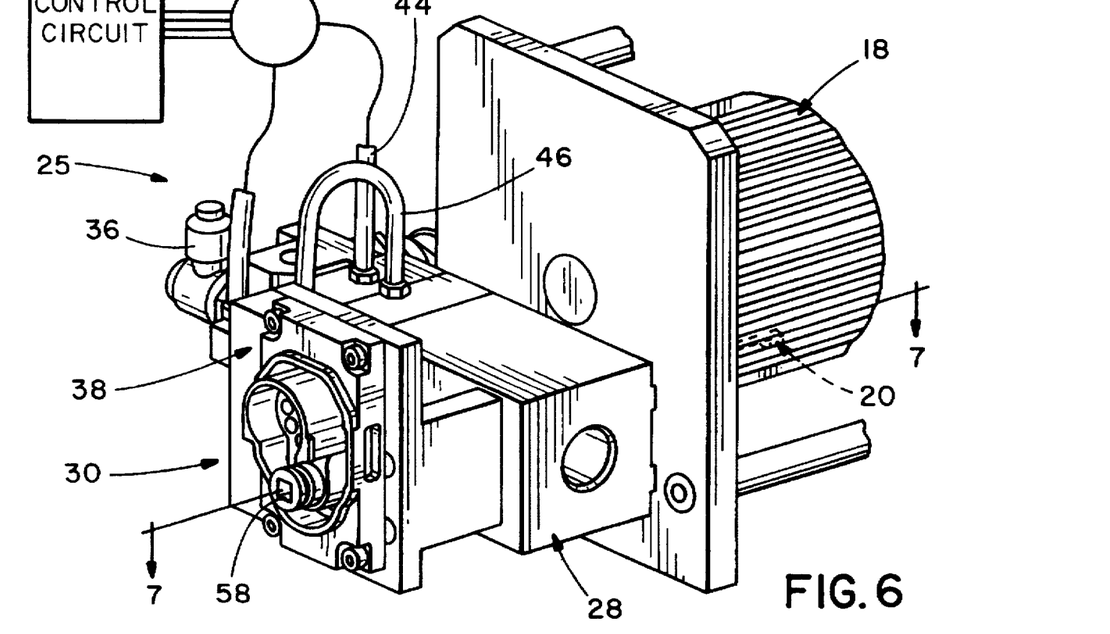
FIG. 6 is a perspective view of the blockage sensing mechanism of the present invention.

As can be seen in FIGS. 2 and 6, the blockage sensing mechanism 25 is disposed generally between the receiving drum 18 and the inlet area 30 of the transfer tube 22 and in addition to the control circuitry (not shown) is comprised of a connector block assembly 28, an air inlet 36 a pair of pressure taps 44, 46 and a pressure regulator 34. This positioning of the connector block assembly 28, the pressure taps 44, 46 and the circuitry of the control unit 35 allows a user to obtain a differential pressure reading to indicate the presence of a blockage in the transfer tube 22 prior to loading and firing of the next cable tie 20.

Figure 7:
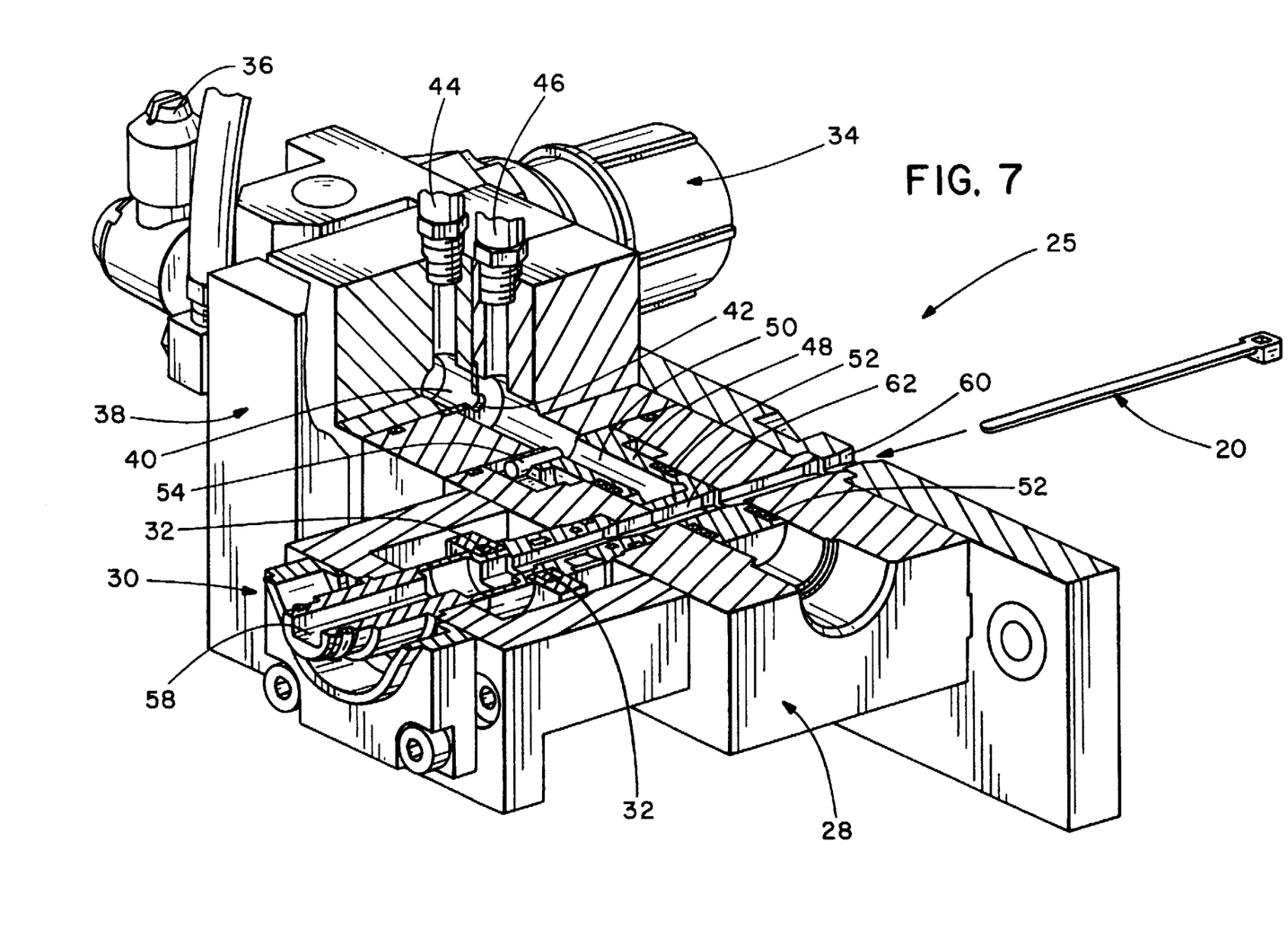
FIG. 7 is a fragmentary perspective view of the blockage sensing mechanism of the present invention.
Figure 8:
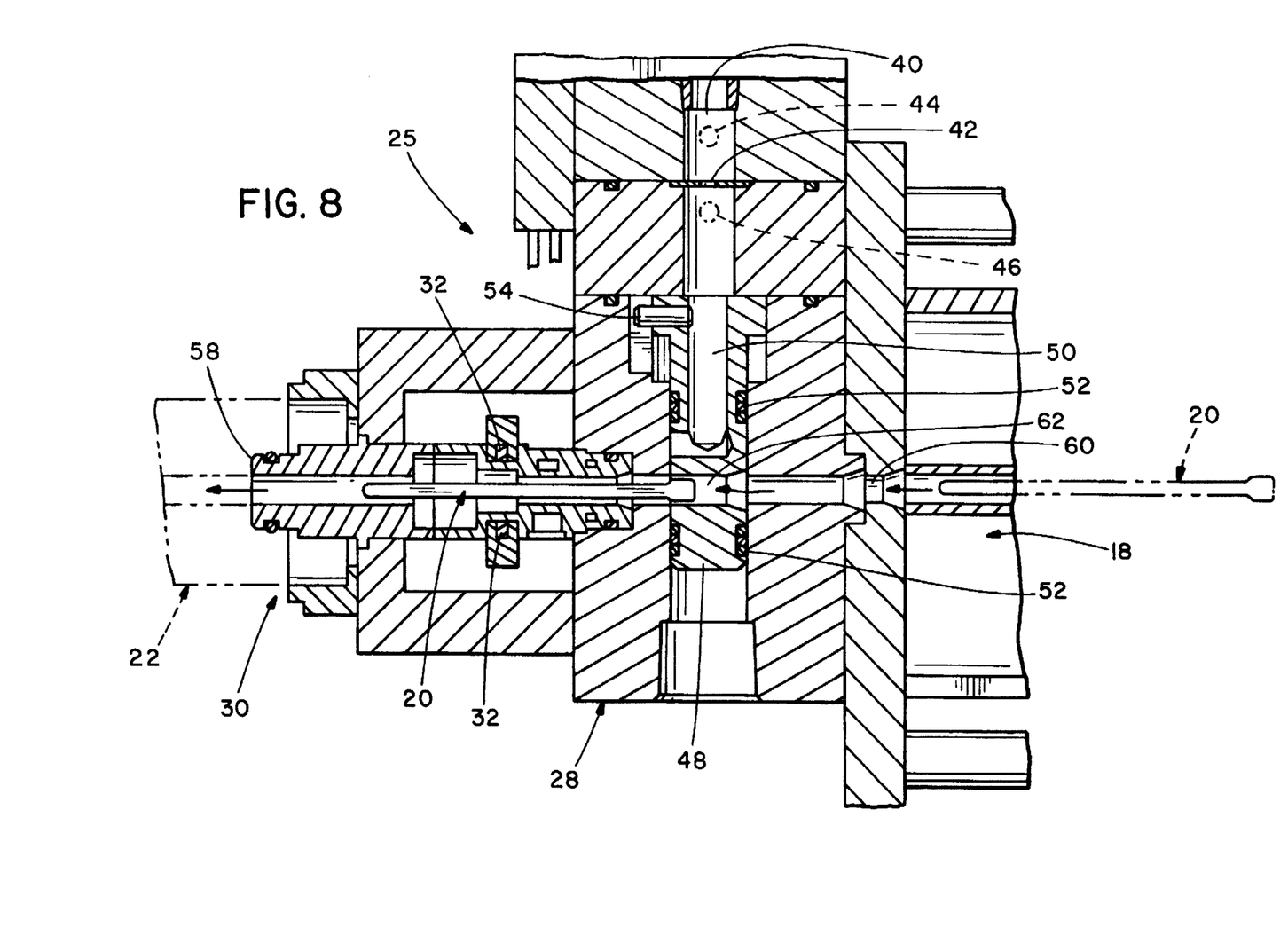
FIG. 8 is a top sectional view of the blockage sensing mechanism shown having the cable tie initially received.

As can be seen in FIGS. 7 and 8, the connector block assembly 28 includes a passageway 60 aligned between the receiving drum 18 and the transfer tube 22 through which cable tie 20 is loaded into tube 22. The assembly 28 further includes a first bore 40 into which air flows from the air inlet 36 as regulated by pressure regulator 34. Assembly 28 also includes a sliding piston 48 which has a second bore 50 aligned with first bore 40 and ending in a right turn at its distal end. The connector block assembly 28 and sliding piston 48 also include a plurality of O-ring seals 52 which seal around the piston to prevent air leakage and to ensure proper operation. The first bore 40 includes an orifice 42 of a smaller diameter and the pair of pressure taps 44, 46 opening into the bore from the top. The two pressure taps 44, 46 located upstream and downstream from orifice 42 respectively and are electrically connected to a differential pressure transducer of the control unit 35. There is also a valve 38 which can be switched so that downstream tap 46 is connected to the differential pressure transducer of the control unit 35 or is switched so that the downstream tap 46 is blocked and that side of the pressure transducer vents to atmosphere. Additionally, positioned at the exit area of passageway 60 is a first optical sensor 32 which indicates when the tie 20 has passed into the inlet area 30 of the transfer tube 22. Finally, there is a second optical sensor situated near the exit end of tube 22 (not shown) that indicates when a tie has passed and that a proper firing has occurred.

Figure 9:
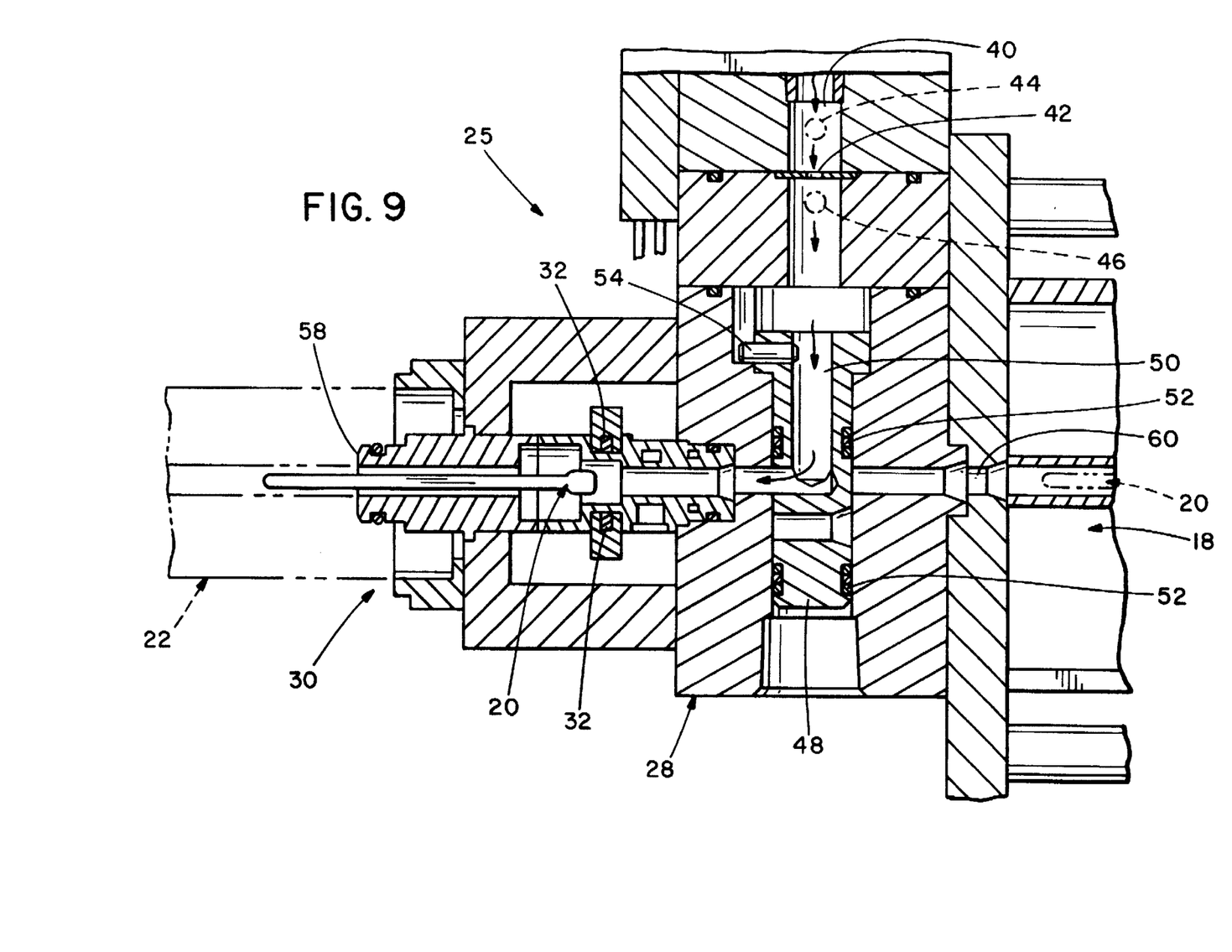
FIG. 9 is a top sectional view of the cable tie ejection area shown with the cable tie after passing the blockage sensing area.

As can be seen in FIGS. 7-9, during a normal cycle of advancing a cable tie through the tube 22 to tool 12, when the user activates the trigger, a primary air burst is sent through the drum 18 to move the loaded tie 20 through a cable tie passageway 60 past first optical sensor 32 and into position for advancement through tube 22. As seen in FIGS. 7 and 8, sliding piston 48 initially rests on a first surface for correct alignment of the piston bypass cable tie passageway 62 with the cable tie passageway 60. When first optical sensor 32 detects that tie 20 has passed, it sends a signal to the control unit 35 which stops the primary air blast from the drum to prevent the tie 20 from moving too far down into the transfer tube 22 and to allow for the loading of the next tie 20 into position in the drum 18. The signal from first optical sensor 32 that the tie has passed also results in the control unit 35 initiating the secondary air burst which goes through air inlet 36 into first bore 40 which hits the far wall and moves the sliding piston 48 into the position shown in FIG. 9 which aligns the distal end of second bore 50 with passageway 60 and pushes the tie 20 through the tube 22 to the tool 12. The secondary burst of air from inlet 36 pushes the sliding piston 48 into the sealed position and simultaneously seals the passage and conveys the cable tie 20. An anti-rotation pin 54 is engaged with piston 48 to prevent rotation and misalignment of the piston 48. After the second optical sensor (not shown) at the tool end of the tube signals that the tie has passed, the control unit knows that the tool is ready for another normal cycle. If, however, the tie does not pass the second optical sensor (not shown) or the control unit is otherwise in a state in which it tells the tool to operate a test cycle, then the user will not be able to fire another tie into the tube.

The test cycle consists of only sending the secondary air burst through inlet 36 such that piston 48 will move and bore 50 will align with passageway 60. The primary air burst which moves the tie from the drum into the transfer tube has not been sent and therefore the tie 20 was not loaded into the entrance end of the transfer tube 22 for advancement by this secondary air burst. The pressure taps 44, 46 will take pressure readings which will be checked by the control circuit. If there exists a blockage, the pressure differential across the orifice will be smaller than in the condition of no blockage, because flow is restricted by the blockage. The control unit receives and checks the pressure differential information from the taps 44 and 46 and controls the operations of the tool accordingly.

Figure 10:
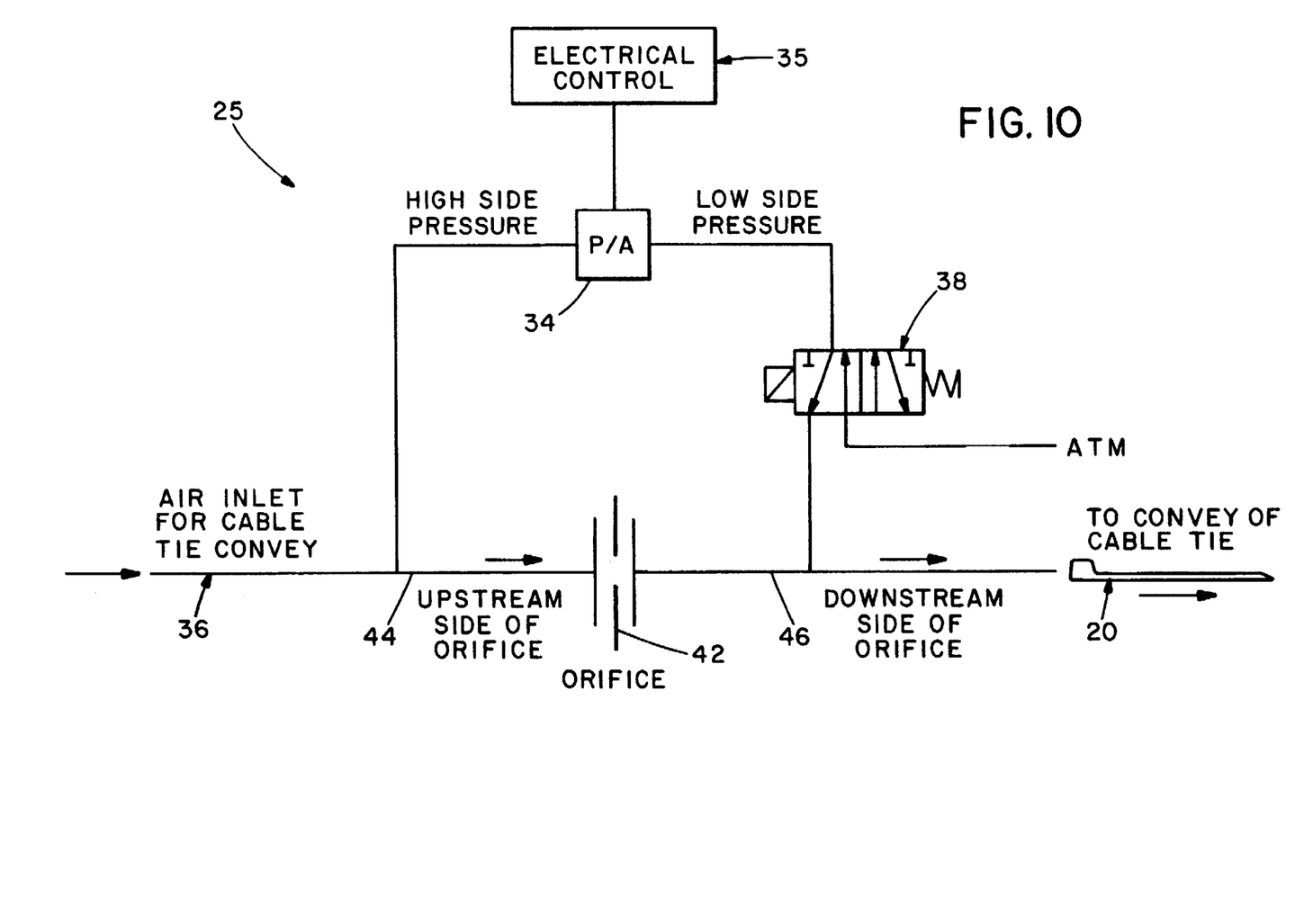
FIG. 10 is a schematic view of the mechanisms of the cable tie blockage sensing mechanism of the present invention.

It is to be noted that the initial test air burst to check the pressure differential is not performed before every cycle, but only under certain conditions indicated to the control circuit such as each time the system is first powered up, each time the cable tie convey tube is disconnected from the system and reconnected and any time the control does not see the proper input from the cable tie convey optical sensors. As can be seen from the schematic of FIG. 10, the control circuit checks the status of the cable tie conveyance tube as follows. The electronic control unit 35 first opens up a convey air inlet valve (not shown) which sends air through air inlet 36, and into bore 40 and through the orifice 42. The valve 38 is initially positioned to vent the low side of the differential transducer to atmosphere, in order to indicate to the control the convey air inlet pressure setting. Next, valve 38 is switched connecting the low pressure side of the transducer to the downstream tap 46 so that the differential pressure across the orifice by taps 44, 46 is noted by the electronic control. The electronic control consults a table in memory to compare the convey air inlet pressure to the indicated differential pressure across the orifice. The result of this comparison indicates to the electronic control whether the cable tie convey tube is clear or obstructed.

The precise positioning of the respective pressure taps 44, 46 can be determined for different specific bore sizes and specific orifice sizes by using standard calculations to optimize the readings.

Figure 3:
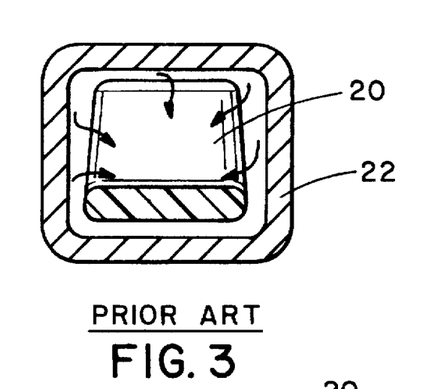
FIG. 3 is a cross-sectional view of the interior of a prior art transfer tube.
Figure 4:
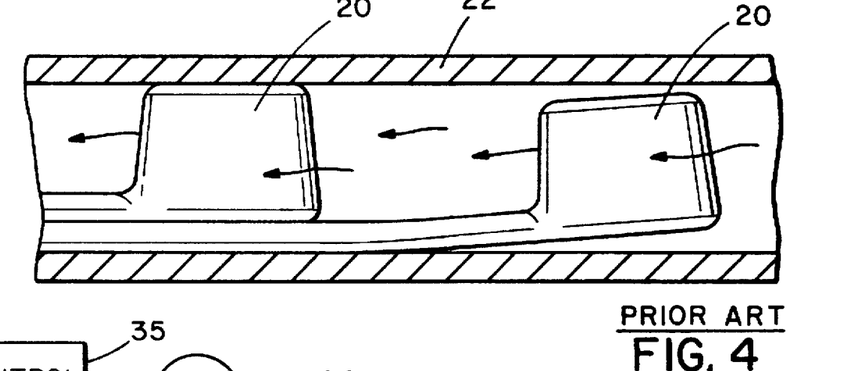
FIG. 4 is a side sectional view of a prior art transfer tube shown in a jammed state.
Figure 5:
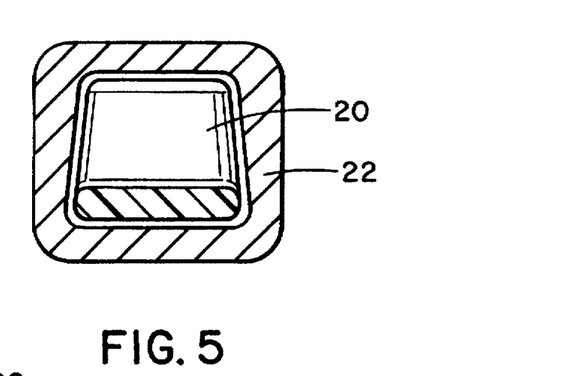
FIG. 5 is a cross-sectional view of the interior of the transfer tube of the present invention.

It is also noted that the transfer tube 22 in the preferred embodiment of the present invention has an interior profile contoured to surround in relatively close proximity the circumference of the cable tie head as can be seen in FIG. 5. Close contouring of the internal profile of the tube 22 to the cable tie head minimizes air leakage around the cable tie head within the tube so that the maximum differential pressure reading is obtained to accurately identify a cable tie presence within the transfer tube. FIG. 3 shows the internal contour of a prior art transfer tube which allows more air to pass unimpeded around the cable tie which results in a smaller pressure differential reading thus making the precise determination of a blockage less accurate and more difficult. FIG. 4 shows a prior tube in the undesired state of having a multiple cable tie jam.

While the particular embodiments of the present invention have been shown and described, it will be obvious to those skilled in the art that changes and modifications may be made without departing from the invention in its broader aspects. The matter set forth in the forgoing description and accompanying drawings is offered by way of illustration only and not as a limitation. The actual scope of the invention is intended to be defined in the following claims when viewed in their proper perspective based on the prior art.

What is claimed is:

1. An automatic cable tie installation tool for fastening an individual cable tie around a bundle of wires or the like, comprising:

cable tie application means for application of the cable tie around a bundle;

cable tie receiving means for receiving and positioning the cable tie for transportation to the cable tie application means;

cable tie advancing means utilizing pressurized air for advancing the cable tie from the receiving means through a transfer tube to the application means;

control means for controlling the receiving means;

sensing means for sensing the presence of a blockage within the transfer tube; and, signaling means for signaling the control means in response to a blockage indicated by the sensing means to prevent the positioning of a next cable tie for transportation to the application means.

2. An automatic cable tie installation tool according to claim 1, wherein the sensing means includes testing means for selectively sending a blast of air into the transfer tube.

3. An automatic cable tie installation tool according to claim 1, wherein the sensing means includes an orifice disposed along a path of the pressurized air that enters the transfer tube and a pair of pressure taps positioned on an upstream side and a downstream side of the orifice respectively, such that the pressure differential across the orifice can be tested to determine if a blockage is present in the transfer tube.

4. An automatic cable tie installation tool according to claim 1, wherein the transfer tube has an internal profile contoured so as to closely surround the cable tie head and still allow for unimpeded passage to the application means.

5. An automatic cable tie installation tool for fastening an individual cable tie around a bundle of wires or the like, comprising:

cable tie application means for application of the cable tie around a bundle;

cable tie receiving means for receiving and positioning the cable tie for advancement to the cable tie application means;

cable tie advancing means utilizing pressurized air for advancing the cable tie from the receiving means through a transfer tube to the application means; and, sensing means for sensing the presence of a blockage within the transfer tube and preventing the advancement of another cable tie.

6. An automatic cable tie installation tool according to claim 5, wherein the sensing means includes testing means for selectively sending a blast of air into the tube prior to the positioning of the cable tie for advancement to the application means.

7. An automatic cable tie installation tool according to claim 5, wherein the sensing means includes an orifice disposed along a path of the pressurized air and a pair of pressure taps positioned on an upstream side and a downstream side of the orifice, respectively.

8. An automatic cable tie installation tool according to claim 5, wherein the transfer tube has an internal profile contoured so as to closely surround the cable tie head and still allow for unimpeded passage to the application means.

* * * * *